(12) United States Patent
Vieira Teixeira et al.

(10) Patent No.: US 11,467,057 B2
(45) Date of Patent: Oct. 11, 2022

(54) MAGNETO-OPTICAL SYSTEM FOR GUIDED WAVE INSPECTION AND MONITORING

(71) Applicant: EQS—ENGENHARIA, QUALIDADE E SEGURANCA, LDA., Maia (PT)

(72) Inventors: Joao Gil Vieira Teixeira, Oporto (PT); Gabriel Jose Magalhaes Dinis, Senhora da Hora (PT); Helder Filipe Madureira Araujo, Rio Mau PNF (PT); Carlos Avelino De Jesus Gouveia, Oporto (PT); Eduardo Miguel Lage Dixo De Sousa, Vila Nova de Gaia (PT); Luis Miguel Jardim Noites, Oporto (PT)

(73) Assignee: EQS—ENGENHARIA, QUALIDADE E SEGURANCA, LDA., Maia (PT)

( * ) Notice: Subject to any disclaimer, the term of this patent is extended or adjusted under 35 U.S.C. 154(b) by 151 days.

(21) Appl. No.: 16/772,639

(22) PCT Filed: Oct. 26, 2018

(86) PCT No.: PCT/IB2018/058385
§ 371 (c)(1),
(2) Date: Jun. 12, 2020

(87) PCT Pub. No.: WO2019/116118
PCT Pub. Date: Jun. 20, 2019

(65) Prior Publication Data
US 2021/0080343 A1 Mar. 18, 2021

(30) Foreign Application Priority Data

Dec. 14, 2017 (PT) .................................. 110451

(51) Int. Cl.
*G01M 5/00* (2006.01)
*G01N 29/04* (2006.01)

(52) U.S. Cl.
CPC ........ *G01M 5/0033* (2013.01); *G01N 29/041* (2013.01); *G01N 2291/011* (2013.01); *G01N 2291/0427* (2013.01)

(58) Field of Classification Search
CPC . G01M 5/0003; G01N 29/041; G01N 29/223; G01N 29/2418; G01N 29/2412;
(Continued)

(56) References Cited

U.S. PATENT DOCUMENTS 5,378,889 A * 1/1995 Lawrence .......... G01N 33/1833
250/227.16
5,581,037 A 12/1996 Kwun et al.
(Continued)

FOREIGN PATENT DOCUMENTS

JP 2016028224 A 2/2016

OTHER PUBLICATIONS

Rose et al., "A Hybrid Ultrasonic Guided Wave-Fiber Optic System for Flaw Detection in Pipe", Appl. Sci., 2018, vol. 8, No. 727, pp. 1-14.
(Continued)

Primary Examiner — Tarun Sinha
(74) Attorney, Agent, or Firm — Lucas & Mercanti, LLP (57) ABSTRACT

The present application describes a magneto-optical based guided waves system for inspection and monitoring of assets. The system has a magnetostrictive-based wave emitter for signal generation and a network of optical fiber sensors for detection, both mechanically coupled to the asset, a device with embedded software for hardware control and signal processing, and a framework capable of providing visual and analytic insights about the condition of the structure of interest. The enhancement of flaw detection, location and characterization abilities of the system are obtained through the use of high sensitivity and passive fiber (Continued)

optics sensors with very small size, distributed and multi-parameter sensing capabilities.

18 Claims, 6 Drawing Sheets

(58) Field of Classification Search
CPC ......... G01N 29/4436; G01N 2291/011; G01N 2291/0427; G01N 2291/0234; G01N 2291/044; G01N 2291/048; G01N 2291/103
See application file for complete search history.

(56) References Cited

U.S. PATENT DOCUMENTS

| | | | |
|---|---|---|---|
| 5,639,262 | A | 6/1997 | Lim |
| 6,429,650 | B1 | 8/2002 | Kwun et al. |
| 8,234,924 | B2 | 8/2012 | Saxena et al. |
| 9,158,054 | B2 | 10/2015 | Giurgiutiu |
| 9,201,161 | B2 | 12/2015 | Goldner et al. |
| 2019/0064030 | A1* | 2/2019 | Sundermann ......... G01L 11/025 |

OTHER PUBLICATIONS

Thursby et al., "Versatile fiber Bragg grating arrays for strain mapping and ultrasound Lamb wave detection", Proceedings of SPIE, 2006, vol. 6379, 12 pages.

Culshaw et al., "The Detection of Ultrasound Using Fiber-Optic Sensors", IEEE Sensors Journal, 2008, vol. 8, No. 7, pp. 1360-1367.

Betz et al., "Structural damage location with fiber Bragg grating rosettes and lamb waves", SHM. Structural Health Monito, 2007, vol. 6, No. 4, pp. 299-308.

Kersey, "Fiber Optic Sensors—An Introduction for Engineers and Scientists", 11.2.5 Quasi-Distributed Sensors, 2011, pp. 287-290.

Deutsch et al., "Ultraschallpruefung: Grundlagen Und Industrielle Anwendungen", 1997, pp. 74-81.

Pierce et al., "Surface-bonded and embedded optical fibers as ultrasonic sensors", Applied Optics, 1996, vol. 35, No. 25, pp. 5191-5197.

International Search Report and Written Opinion for Corresponding International Application No. PCT/IB2018/058385 (dated Feb. 15, 2019) (17 Pages).

* cited by examiner

MAGNETO-OPTICAL SYSTEM FOR GUIDED WAVE INSPECTION AND MONITORING

CROSS-REFERENCE TO RELATED APPLICATIONS

This application is a 371 of PCT/IB2018/058385, filed Oct. 26, 2018, which claims the benefit of Portuguese Patent Application No. 110451, filed Dec. 14, 2017, both applications are incorporated herein by reference.

TECHNICAL FIELD

The present application is related to a magneto-optical system for guided wave monitoring and inspection of assets.

STATE OF THE ART

Critical assets in industrial facilities may be susceptible to corrosion, especially in the chemical, energy, oil and gas sectors. Over time, due to structure aging, corrosion will reduce the original wall thickness of these structures which may compromise the ability to meet predefined relevant standards, consequently affecting the reliability of their operation. The deterioration mentioned earlier, can accelerate the appearance of flaws, ultimately culminating in the collapse of the structure. Thus, within the scope of protection and optimization of structural resilience of critical assets, it is fundamental to carry out inspection and monitoring of structural integrity, to follow the evolution of the structure condition during its aging.

In this context, guided waves technology has shown capabilities of surveying large structural components for defects, providing a comprehensive information about its integrity conditions. Piezoelectric and magnetostrictive are the most common transducers for either generating or detecting guided waves. Magnetostrictive technology is cheaper and more appropriate to operate at high temperatures and pressure environments. An extensive review on the available technology for guided wave non-destructive evaluation can be found in Kim et al. in "Review of magnetostrictive patch transducers and applications in ultrasonic nondestructive testing of waveguides", Ultrasonics 62 (2015).

In the past, efforts have been made to develop magnetostrictive sensor technologies for the inspection and monitoring of large structures. The U.S. Pat. No. 5,456,113 provides a background on the magnetostrictive effect and its use in the Non-Destructive Evaluation (NDE) and is therefore incorporated herein by reference.

These efforts in the past were focused primarily in the development and improvements of the magnetostrictive sensors for emitting and receiving guided waves. The U.S. Pat. No. 5,581,037 describes the method and the device used for generating and detecting guided waves for inspection of ferromagnetic or non-ferromagnetic tubular structures. For inspection of ferromagnetic structures permanent magnets or electromagnets and a coil are employed. For non-ferromagnetic structures a layer of a magnetostrictive material is attached. The use of this method and apparatus is limited for inspection of cylindrical structures. Later, the U.S. Pat. No. 6,429,650 introduced the use of torsional waves for inspection of tubular structures and the utilization of a ferromagnetic flexible strip for wave emission. Torsional waves have better properties when compared to other modes since: shear compression doesn't interfere with most of liquids; its fundamental mode group velocity is not frequency dependent; it has lack of dispersion and they were shown to present higher sensitivity to axial and circular defects.

The U.S. Pat. No. 5,639,262, introduced the concept of long term monitoring magnetostrictive sensors, extending the previous idea to the majority of the structures, presenting also the use of flexible printed coils.

One of the limitations of the previous approaches regarding long term monitoring applications is the loss of the residual magnetization of the magnetostrictive strip over time. In this context, the disclosure of U.S. Pat. No. 6,429,650 describes the possibility of maintaining the biasing field by using a coil connected to a DC source or a low frequency AC (approximately 10 Hz) or by using permanent magnets attached to the sensor.

The precise location of the flaws is critical for proper mapping of the corrosion along the structure. Magnetostrictive transducers are usually based on a single full length patch, providing a stronger signal, either for emission or reception. Despite this, it hinders angular location capabilities, since the magnetostrictive response is sensitive to signals coming from different angles. To overcome this issue, the U.S. Pat. No. 8,354,842, describes the use of a segmented array of magnetostrictive transducers, each one of them, emitting and receiving independently. In this way, it is possible to improve the defects location capabilities by knowing both the distance and angle. However, the increase in overall hardware, signal processing and cost, leads to a system much more complex. Also, the emission signal becomes weaker (due to the sectioning), thus, decreasing the overall performance of the system. Moreover, because the generated wave results from the interference between all the individual signals, emitted separately by each section, one needs to account with the near field of the setup.

On the other hand, fiber optics sensors have been widely employed for structural health monitoring. A comprehensive review about fiber optic sensors for structural health monitoring (SHM) can be found in Lopez-Higuera et al. "Fiber optic sensors in structural health monitoring", Journal of lightwave technology, 29.4 (2011).

Guided wave detection using fiber optic sensors is particularly interesting due to its small size, high sensitivity, safety, electromagnetic interference immunity and distributed sensing capabilities. The first demonstration of a fiber optic sensor for guided wave detection was reported by Pierce et al. in "Surface-bonded and embedded optical fibers as ultrasonic sensors", Applied Optics 35.25 (1996); the detection of Lamb waves in carbon fiber reinforced plastic were successfully detected by using an all fiber Mach-Zehnder interferometer. Since then, a number of research groups around the world have used a variety of fiber optic devices to detect guided waves in various materials differing in shape and composition. For instance, Lee et al. in "Integrated guided wave generation and sensing using a single laser source and optical fibers", Measurement Science and Technology 21.10 (2010); studied a system combining a piezoelectric actuator with fiber Bragg gratings (FBG) for pipeline monitoring based on the generation of longitudinal waves using a piezoelectric system, combined with a FBG detection scheme. Also, Harish et al. in "Detection of fundamental shear horizontal mode in plates using fiber Bragg gratings", Journal of Intelligent Material Systems and Structures 27.16 (2016); reported the detection of shear horizontal waves in aluminum plates using FBGs.

The U.S. Pat. No. 8,234,924 describes a device and a method to detect and locate damage in structures using optical technology. The method consists in generating an ultrasonic bulk wave, correctly positioning and coupling the optical detectors, to obtain the correct damages location in the structure. On the other hand, the device is formed by a flexible structure having at least one optical detector attached to it.

The U.S. Pat. No. 9,201,161, describes a method and device based on fiber optic sensors, for pipeline monitoring, where one or a group of optical fiber sensors are used to detect mechanical and vibrational acoustic energy. The device is composed of the optical source, detector, and a group of fiber optic sensors. The method includes the data storage and analysis. The application of this system ranges from perimeter security to leak detection and acoustic sensing.

The U.S. Pat. No. 9,158,054 describes an acousto-optic sensor. A fiber optic sensor or an array of fiber optic sensors are encapsulated within a ring shaped structure optimized to operate at a certain frequency. The sensor can be applied to guided waves, acoustic emission or thickness measurement. Nevertheless, the use of this encapsulation limits the operating frequency and disables the mode filtering capabilities of the sensor.

GENERAL DESCRIPTION

The present application is related to a magneto-optical system for guided waves monitoring and inspection.

The solution herein described combines the potentialities of full-length magnetostrictive transducers for wave emission, with the advantages of fiber optic sensors technology for wave detection. Particularly, the possibility of spreading a network of sensors around the structure improves the flaw detection, localization and characterization abilities of the guided waves evaluation technique. It differs from the previous developed optical solutions of the state of the art because it is specific for guided waves and it does not use any additional element, such as a ring, that limits the operation frequency and could disable the mode filtering capabilities of the sensors. In fact, using guided waves instead of bulk waves, it is possible to achieve much greater inspection ranges than when using traditional ultrasonic testing methods. In guided waves, because the wave travels along the medium, guided by its boundaries, it is possible to inspect hidden and inaccessible regions of the assets and screen 100% throughout the thickness of the structure up to a certain extent, usually 50 meters from the state-of-the-art. The outcome is a more cost-effective method of inspection or monitoring of a structure.

The system now proposed is comprised of a wave emitter based on magnetostrictive transducer technology, a network of optical fiber sensors for detection, a central processing unit with embedded software for hardware control and signal processing, and a framework capable of providing visual and analytic insights about the condition of the structure of interest.

Both the emitter and the receivers—optical fiber sensors—are mechanically coupled to the asset to be monitored. According to the intended purpose of the system a suitable couplant should be chosen, taking into account that shear wave modes are not supported in Newtonian fluids. For shear-horizontal/torsional wave modes it is usually used honey or other viscous materials, while for lamb waves/longitudinal waves it is commonly employed mineral oil or glycerin. Some high viscosity epoxy resins are reasonably efficient in transmitting tangential motions and have high heat resistance, corrosion and abrasion making them suitable for monitoring applications. The wave emitter is the element responsible for generating the elastic wave that is guided by the boundaries of the structure. At an indication location in the asset, either a feature or a defect, due to a difference of cross-section or a localized change of stiffness, an echo—acoustic wave—is generated which is then detected by the fiber optic sensors, that are spread along the structure. The number of fiber optic sensors used depends on the monitoring area and the desired measurement level of accuracy, but at least three sensors are needed to allow the correct determination of the echoes location, considering the longitudinal and angular position of the echoes source. Other number of fiber optic sensors may be applied.

The displacements caused by the acoustic waves (echoes) sensed by the fiber optic sensors that are mechanically coupled to the structure, are subsequently guided by the optical fiber to the detection stage, where an electric signal is generated. Then, through the generated A-Scan (Amplitude-Scan of the echo), the time of arrival of said acoustic waves are calculated by measuring the time difference between the echo and the excitation pulse, and with their velocity in the medium—structure—which may be frequency-dependent according to the dispersive nature of the excited mode, it is possible to identify and locate the defects, and infer about their characteristics.

The magnitude of the strain waves resulting from the echoes coming from the flaws in the structure, depending on the magnitude of the incident wave and the defect cross-section, are in the order of few nanostrains. Also, guided waves systems usually operate in the range of frequencies from 10 Khz-512 kHz. On the other hand, most of the commercially available optical fiber strain sensors, for instance FBG sensors, are specified for an operation range in the order of microstrain. Moreover, commercially available FBG interrogators are wavelength decoding devices, with a precision in the range of 0.5-1 pm which can be translated in a strain resolution around 0.5-1 microstrain. It is important to mention that the acquisition rate of those devices ranges between 1 Hz-35 kHz, therefore, they are not suitable for guided waves sensing. In order to be capable of detecting those very small and fast variations, an optimization study of the sensor together with the interrogation scheme, was carried out.

For instance, a laser based detection scheme can be used. It consists of a laser source with a narrow linewidth, adjusted to a wavelength corresponding to, more or less, half the leading or trailing slope of the FBG. When strain is applied to the sensor the spectrum shifts in wavelength, modulating the reflected and transmitted laser power proportionally to the applied tension or compression. Then, the strength of the acoustic wave will be proportional to the variation of the transmitted or reflected light read with a photodetector. In our development, some changes are introduced in the tuning process. Due to the non-symmetric spectral response of the FBG, it is possible that the maximum sensitivity point does not correspond to the half of the leading or trailing slope of the FBG. Also, it is noticed that both sides, right and left, do not present the same slope. Thereby, to maximize the performance of our device, we intend to tune the laser to the wavelength where our detection responds better to the strain. In order to achieve that, the spectrum of the FBG is recorded, by sweeping all the wavelength range where the sensor is located. Then, this data is derived, the maximum of the derivative will give us the most sensitivity point. Finally, the operation point of the laser is set to this wavelength. All this process is carried out by the control and processing unit.

In this scheme, the acquisition rate depends only on the response of the photodetectors and the analog to digital converter. Also, the sensitivity depends on the linewidth of the laser and the spectral shape of the FBG. For a fixed laser linewidth, the sensitivity of the FBG is defined by the gradient of the leading or trailing edge of its spectral response. A steep edge gradient response will show higher sensitivity, and thereby, it is desired for guided wave detection. The spectral response of the sensor depends on the fabrication parameters. The steep edge response of the sensor depends on the strength or reflectivity of the FBG, and stronger FBGs shows a steeper gradient. The strength of the FBG is determined by the physical length of the sensor and by the contrast of the modulating refractive index.

Besides FBGs, another fiber optic sensing configurations can be used. For instance: all-fiber interferometers such as FBG Fabry-Perot cavities or conventional Michelson and Mach-Zhender fiber optic interferometers. Also, specially for interferometer interrogation, white light readout interferometers can be used for sensor interrogation.

Depending on its physical shape and packaging, fiber optic strain sensors are mostly sensitive to displacements on its longitudinal direction, thus, the angular position of the sensing devices—fiber optic sensors—relative to the acoustic transducer of the guided wave, is a key issue to be able to detect them. In fact, since different families of guided wave modes—longitudinal/lamb waves, torsional/shear horizontal waves, and flexural waves—propagate in the structure at different angles, it is necessary to establish the optimal sensing device's angular orientation for each mode. In this context, starting from theoretical values, an experimental study of optimization carried out allowed to conclude that longitudinal modes can be sensed when the sensor is perpendicular to the direction of the propagating wave, and torsional/shear horizontal waves can be detected with the fiber at an angle of 45°±5° regarding the direction of the propagating wave. However, this angle depends on the magnitude of both AC and DC magnetic fields, and needs to be adjusted according with these parameters. Thus, combining sensors with different angular orientation, it is possible to filter and detect the different modes. Mode filtering is particularly interesting due to the mode conversion that occurs when a axisymmetric mode (ex: $T_{0,1}$) is incident in a asymmetric feature in the structure. The detection stage starts with the fiber optic sensors network, comprised by at least one optical node. Each node contains an array of at least three sensors, slightly axially separated with the same angular orientation. With this arrangement it is possible to detect, for a single family of modes, the defect's angular and longitudinal position. If it is intended to detect a different family of modes, the number of sensors within each array must be multiplied by the number of families to be read, each subset of sensors with the proper angular orientation according to the desired mode. The number of sensors of each array may vary depending on the dimensions of the structure.

In this way it is possible to achieve: evaluation range extension, or excitation power reduction. Also, the large amount of data coming from different axial and angular positions along the structure, allows a more precise evaluation leading to an increase in the reliability of the structure condition readout. In addition, due to the temperature sensing capabilities of fiber optics, it is possible, by incorporating in each node a fiber optic temperature sensor, to measure and compensate the thermal changes in the propagation of the mechanical wave in the structure. This possibility enhances the localization accuracy of the system.

Therefore, the technology now developed combines the potentialities of non-segmented patches magnetostrictive transducers for wave emission with the advantages of fiber optic sensors technology for wave detection and a strong data analysis framework. Combining these two transducing technologies with an advanced data analysis, enhances the flaw detection, localization and characterization abilities of guided waves evaluation technique. In fact, Magnetostrictive technology represents a versatile alternative to piezoelectric transducers for guided waves generation, allowing the adaptation to different structure shapes and implementation scenarios, with its respective specificities in terms of, for instance, temperature or pressure. Such versatility is not possible to be achieved using piezoelectric transducers. On the other hand, by using fiber optics for guided waves detection, an intrinsic low optical attenuation is achieved, which allows its operation over long transmission lengths, so that the sensors can be placed along the structure of interest, away from the central processing unit, and the data can be reliably transmitted between them. Besides that, it is possible to multiplex several optical sensors in a single fiber, performing distributed sensing of a single parameter or assessing multiple-parameters (ex: temperature, vibration, static strain, among others) along the structure under evaluation. In addition, its packaging can be physically small and lightweight. Combining its very small size capabilities with the inherent multiplexing capabilities, it is possible to achieve higher spatial resolution, enhancing the flaw location ability of the system.

On the other hand, optical signals are electromagnetically passive, so they can be used in high electric field environments. They do not need to be locally powered, and, they can be used without risk in an explosive industrial environment. They are chemically and biologically inert, since its basic constituent (silica) is resistant to most of the chemical and biological agents, resulting in inherently corrosion resistant sensors. Additionally, fiber optic sensors can operate at high temperatures (up to 1000° C.) due to the high melting point of glass.

DESCRIPTION OF EMBODIMENTS

The present application relates to a system for non-destructive evaluation of assets, such as pipelines, plates or rods. Specifically, the present subject matter is related with a magneto-optical system for guided waves monitoring and inspection.

For that purpose, the system herein described combines the wave emission based on magnetostrictive transducers through the Joule effect with the fiber optic detectors.

Magnetostrictive transducers are based on a magnetic circuit, consisting of permanent magnets or electromagnets, a coil, and a magnetostrictive material. The magnetostrictive material can be the evaluated structure itself, in case the structure is composed of a ferromagnetic material; or an external element that is mechanically coupled to the structure under evaluation. The permanent magnets or electromagnet provides a static (DC) bias magnetic field ($H_0$) needed for wave generation, the coil transforms the electric signal into a suitable shaped magnetic field ($\Delta H$), and the magnetostrictive material through the Joule effect transforms the resulting field ($\Delta H + H_0$) into a mechanical vibration. The mechanical waves produced then propagate not only through the magnetostrictive material but also along any material mechanically coupled to the magnetostrictive material. Of course there are limitation regimes where generation of guided waves would not be possible. These depend on the nature of materials, their constants and stress conditions. Also, it is well-known in the literature the existence of frequency regions in which guided waves cannot be properly generated due to characteristic of the structure and its elastic properties. These limitations can be studied by considering the dispersive wave characteristics. Taking into account the previous limitations, non-ferromagnetic and/or non-magnetostrictive materials can serve as waveguides for the mechanical waves. The configuration of the magnetic circuit and the magnetostrictive material determine the generated mode, and consequently affect the excited and measured waveforms. The most common magnetostrictive materials are iron, nickel cobalt, and alloys based on these elements.

Regarding the detection stage, a network of fiber optic sensors organized into optical nodes is used. The combination of data from the whole distributed sensing network, considering its different configuration—position and angle of the respective sensors—encompassing information from various wave modes, enhance the flaw detection, location and characterization.

Considering the emission/detection configuration procedure, there are two different probes: a magneto-optical transducer (MOT), composed of a magnetic circuit for wave generation, and an optic node for detection, packed together in a protective shell in order to protect its contents from the environment and vice versa, operating in a pulse-echo configuration. This protective shell should be constructed in a way that ensure a good acoustic energy transfer between the internal elements (magnetostrictive strip and optical sensors) and the structure under evaluation. Secondly, there is an optical node encapsulated used exclusively for detection, operating in a pitch-catch or through transmission configuration. Regarding the sensing architecture, two different modes of operation can be used: it is possible to have a single MOT operating in a pulse-echo configuration, or an arrangement of MOT's with one or more ON's distributed along the structure, operating in a pitch-n-catch configuration. The latter allows to extend the operation range of the system.

The ON's location is checked to ensure it is free from external corrosion or loose materials. It is advisable to place the sensors at least 1 meter apart from any features of the asset. To reduce mirroring, the sensors should not be positioned equidistant between any features existent in the structure, to avoid masking of the mirror echoes. The spacing between sensors shall be such that full coverage of the asset extent is possible with a minimum number of the total MOT's and ON's installed. Positioning the sensors within the diagnostic range of a known feature/datum may be advisable for future correlation of measures with multiple sensors.

The software comprises both the control over the guided-wave parameters for emission, together with the signal acquisition and storage, and the analysis of the guided wave signal from the storage medium after data collection. One will refer to each one of these as the Wave Emission and Acquisition Module (WEA) and the Data Analytics platform (DA) further on. On the former, the user may choose the desired operating frequency of the sent guided-wave pulse. A frequency sweep is also available, through the definition of the initial value, step value and end value, in order to infer about the particular characteristics of a flaw, i.e.: shape, size, depth and type, considering the response change with the frequency. Using the WEA, the user is able to choose the direction in which to sent preferentially the guided-wave. This is done by employing known phased-array techniques during the excitation of the coils. Another feature of this module would be the choice of the sent waveform, i.e: gabor pulse, sine, or other, and parameter tuning, according to the desired total window time and ring down count of the excitation signal. After the wave emission, the signal is recorded in a storage medium for further reading and analysis.

Considering the Data Analytics platform, whose purpose is to process and analyze sets of data to guide the decision making regarding the use or safety surrounding the monitored asset, one can distinguish several features. Firstly, it is provided visualization features, taking, for example, the form of line plots, stacked area graphs, scatter plots, radar charts, donut charts, and heatmaps. Secondly, there is the data processing element, capable of carrying out statistical analysis and signal-processing operations. For example, using this part of the DA platform, the user is able to perform the Fast-Fourier Transform (FFT) of the original raw signal, the Hilbert Transform (HT), the Short Time Fourier Transform (STFT), band-pass filtering, correlating measures, or perform feature scaling. The Decision Support System (DSS) has the purpose of help the user locating and assessing the damage indications read by the sensors. This is accomplished through automatic indication location based on machine learning models, novelty detection based on sensors baseline and false-positives elimination based on sensor fusion. The user may also receive an alarm if a given stream data is above the predefined threshold of normal work of the asset, or if any unusual behavior is perceived by the system. Finally, the Reporting element is used to write annotations, comments, save an analysis and export the data, so that the generated report can be turned and presented for the purpose of supporting key business processes, such as maintenance, repair, or stop of operation of the monitored asset.

Although the user has some control over the WEA and DA, concerning the parameter tuning, direction control and the data analytics functions for data post-processing, the typical work flow is divided into three stages. These are: installation, inspection and monitoring. In the first one, one start by installing the MOT in the asset. The position chosen for the MOT in the frame of reference—asset coordinate frame—is inputted into the software. All following distance computations in the global coordinate frame will be calculated assuming the previously distance was inputted correctly. To gain several of the advantages already discussed, such as screening range extension and robustness due to sensor fusion, it is installed at least one ON in the asset. The number of optical nodes to be installed are a function of the cost and accuracy desired in the flaw identification process. The distance between ON's can be empirical or it can be a function of the geometrical features of the asset, the attenuation of the wave, and the sensitivity of the sensors to call the detection threshold. In the latter, we are able to reduce the total number of ON's installed while maximizing the knowledge possible to extract from the data. The sensor's locations and respective surface preparation should be according to the BS-9690-2, ISO 18211 and E2929 standards. After the installation, one proceed to the Inspection process. The first step is the emission of the signal, with or without direction control. The emitted signal is used to locate all the optical nodes in the asset with respect to the frame of reference. This is achieved by measuring the time-of-arrival (TOA) of the first echo, using the same time reference to all optical node's readings. Another option would be to calculate each optical node location with respect to a known well-defined indication of the structure, whose location was previously defined. After this step it is performed a frequency sweep since attenuation and reflectivity of an indication will depend on this parameter. For each frequency value, it is performed data fusion at the Optical Node level, that is, signals from different optical nodes. This is used to eliminate false positives, increase precision and detect true indications. The data fusion at the Optical Sensors level, uses data from different optical sensors in the same optical node and explores their different position, both angular and axial, to locate the indication's angle. After correctly identifying and locating the indications, we input them into a supervised machine learning algorithm in order to distinguish if they are either characteristics of the asset (edges, welds, joints) or if they are defects/flaws (laminar corrosion). The reflection coefficient is also calculated since it is an important parameter for the cross-section-area characterization of a flaw, by dividing the feature signal amplitude by the incident pulse amplitude. Finally, it is generated a baseline of the actual condition of the asset and stored this result. Both of these stages are done by the central processing unit and belong to the inspection process detailed in the flowchart. In the monitoring process, which can be triggered periodically, with a period defined by the user i.e: hourly, daily, weekly, it is assumed that the inspection process was carried at least once, previously to the monitoring stage. After generating a new baseline, it is compared that to the inspection baseline and performed a set of validation tests. If the signal doesn't pass these tests, an alert is sent to the user informing which tests were failed and which action is expected by the user. The results are then stored and the system waits for an action. These actions could be a maintenance, repair, or a change in any sensor location. If that's the case, it's carried the inspection process to update the sensor's locations and generate a new baseline, otherwise, the system will wait for any action until it's triggered to start the monitoring process again.

BRIEF DESCRIPTION OF DRAWINGS

For easier understanding of this application, figures are attached in the annex that represent the preferred forms of implementation which nevertheless are not intended to limit the technique disclosed herein.

BEST MODE FOR CARRYING OUT THE INVENTION

With reference to the figures, certain methods of implementation are now described in more detail. However, they are not intended to limit the scope of this application.

The magneto-optic transducer and optical nodes receivers use the same installation methodology for emission of guided waves as the currently magnetostrictive transducers developed, concerning the installation on planar or tubular structures. It will be described an application example in a tubular structure, particularly, a 6 mm thickness pipeline with 112.5 mm diameter.

Two probes will be used, a magneto-optic transducer and an optical node, spaced apart by 3000 mm. The installation of the sensors of the optical node is accomplished by fitting the ring sensor package in the tubular structure with the help of an adaptive strip belt. For better mechanical coupling between the sensor and the structure, a thin layer of shear wave couplant should be used in between. The thickness of the couplant can vary between 10 micrometers up to 300 micrometers, depending on its properties. In case of high temperatures no couplant is used. For long term monitoring, an epoxy resin is chosen according to the asset temperature. The installation location should have couplant to provide a better coupling between the sensor and the surface to evaluate. The pipeline coating or surface may hinder the coupling of the sensor to the structure and special care must be taken when choosing the correct location of the transducer assembly, following the standards BS-9690-1, BS-9690-2, ASTM E2929-13 guidelines.

Figure 1:
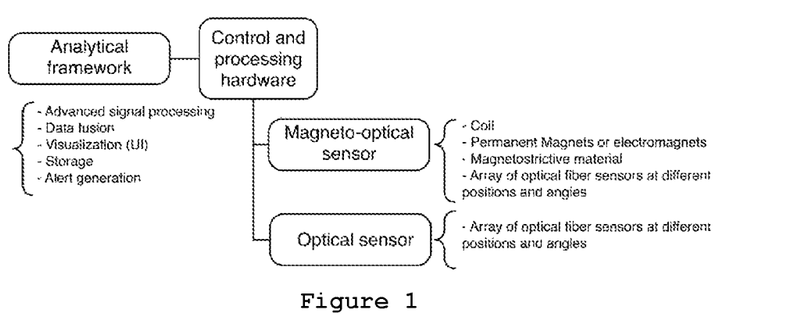
FIG. 1 represents a schematic diagram of the technology now developed.
Figure 2:
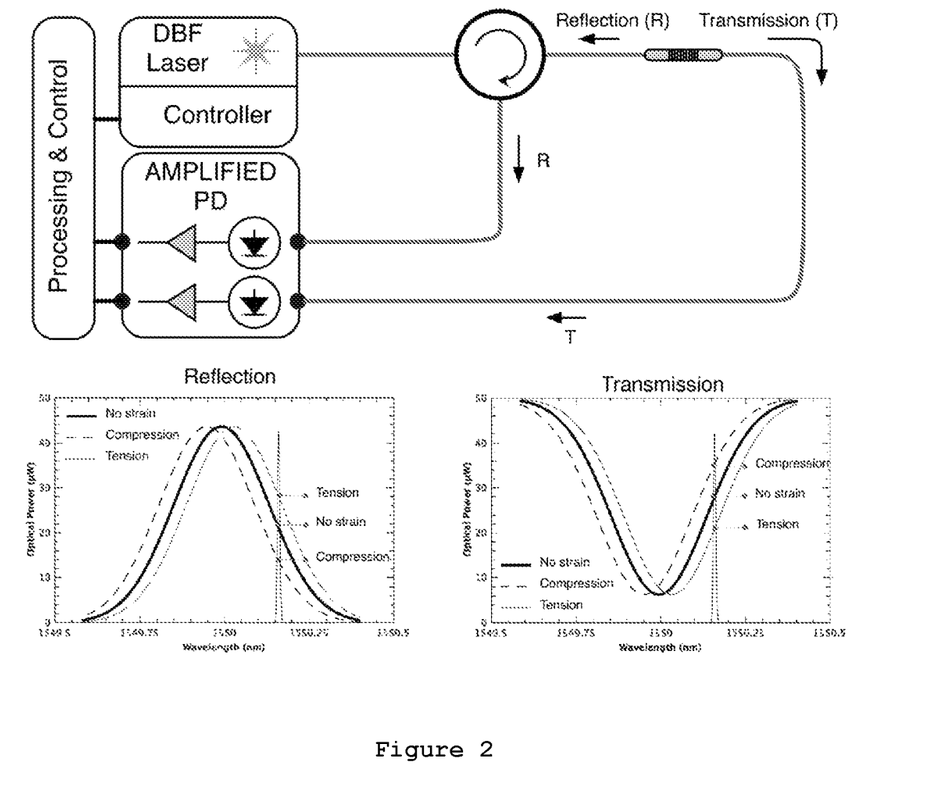
FIG. 2 represents the intensity based interrogation scheme for FBG sensors.
Figure 3:
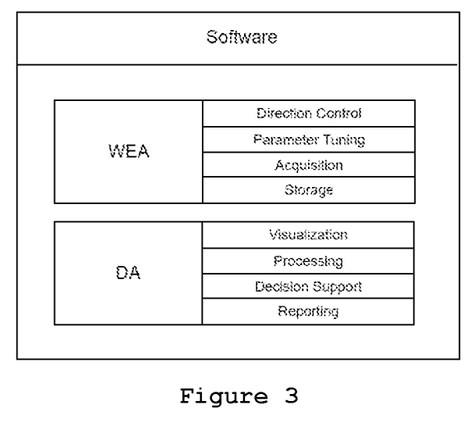
FIG. 3 represents the modules of the method for guided wave emission and processing.
Figure 4:
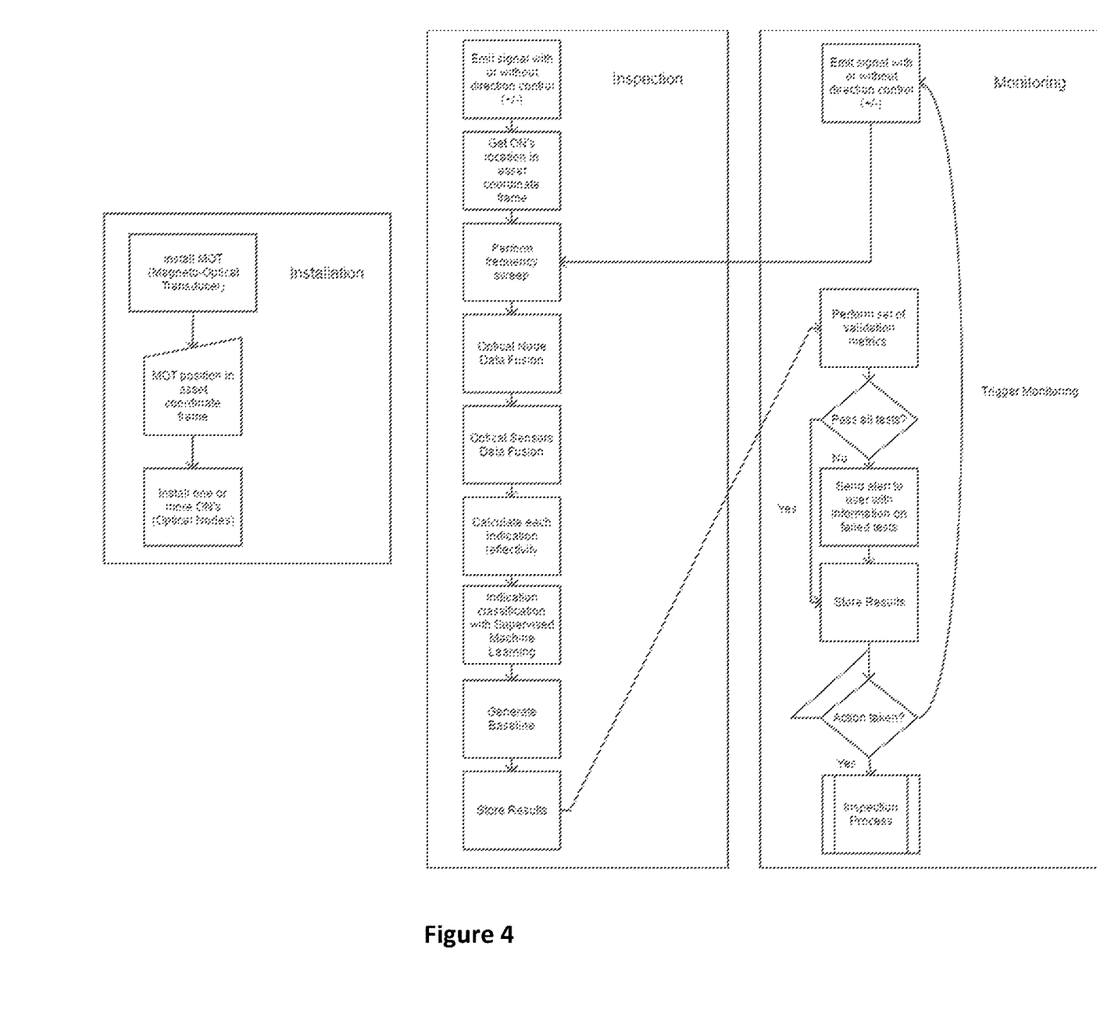
FIG. 4 represents the method flowchart.
Figure 5:
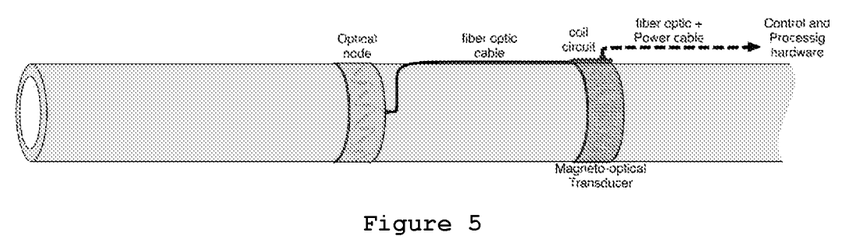
FIG. 5 represents a practical implementation scenario for the system now developed.
Figure 6:
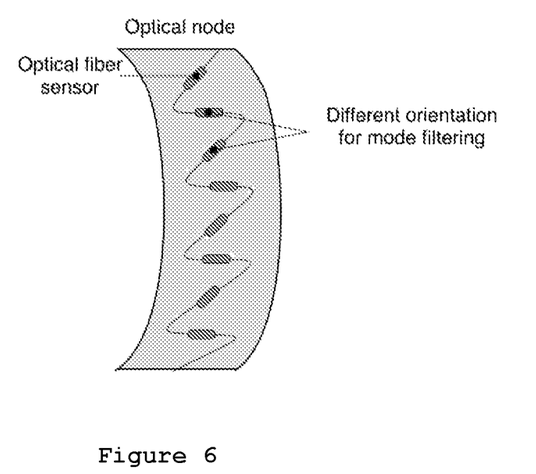
FIG. 6 represents the closer look of the optical node representing a particular configuration for the sensors in terms of position an angular orientation to detect and filter a particular mode.

Following the usual procedure, four different thickness measures in equidistant points along the circumference of the pipeline are taken, and the result is assessed to validate the location of the chosen point. In this example, the magneto-optical transducer is installed at 6895 mm from the end-of-pipe, and the optical node is installed at 9895 mm from the end-of-pipe, according to the FIG. 2. In all the subsequent tests on the structure, the selected mode was torsional, T(0,1) waves, to reduce the dispersive effects of the received signal for better accuracy when estimating the time difference-of-arrival of the echoes.

The magneto-optical ring and the optical ring, were coupled spreading a viscous material, namely, a mix of sugar and water in a controlled ratio, to provide a better transmission of the torsional wave between the structure and the sensors. Attention should be taken to spread uniformly the couplant along the interior of the ring with a thickness between 0.1 and 0.3 mm. Both ring shaped sensors are installed in the pipeline, taking into account that the rings are securely strapped and there are no build-up of couplant on any point. Any potential build-up is eliminated by applying pressure uniformly to the ring with an elastic band. This concludes the installation steps of the installation flowchart depicted in the method workflow.

The magneto-optical transducer includes an optical node and operates in a pulse-echo configuration. The optical node receiver includes an array of fiber optical sensors and operates in a pitch-catch configuration. Both nodes form an optical fiber sensor network. The optical fiber sensor network is in a bus topology, with an optical coupler in each sensor node, and each sensor node including several individual fiber optic sensors. In this case, each optical sensor node has four fiber optic sensors, FBG's, with 10 mm long gratings, spaced by four equidistant angles of ninety degrees along the circumference of the pipeline, and each one at forty five degrees regarding the direction of the propagating wave. Additionally, both probes incorporate an extra fiber optic sensor for temperature measurement. The magneto-optical transducer and optic node share a common light source, a tunable laser with an operation range in the L-band and a linewidth of 2 kHz. The waveform generated is a sinusoid with 4 pulses and a central frequency of 32 kHz. The DC biasing magnetic field is achieved by passing a current through an electromagnet and the voltage applied to the AC coil has 80 Vpp. The direction of the sent torsional-wave, to the left, is controlled using standard phased-techniques, subject to the user choice, during the first step of the inspection flowchart. In relation to the global coordinate system defined for the particular structure, two independent distance measurements are taken. First the location of the magneto-optical probe installation, and secondly, a structural feature or the optical probe, based on which one was the closest to the emission, concluding the data input process step of the installation flowchart. In the present example, it is the optical probe. This distance is compared to the pulse-through transmission signal and used to measure the velocity of the wave. The temperature sensors are then used to measure the temperature along the structure and check for any temperature gradient that might exist for later calibration of the signal. The distance in the global coordinate frame of the optic nodes that remain are measured, based on the time-of-arrival of the echoes and cross-correlations between the different signals, just as shown in the inspection and monitoring flowchart.

After each received signal being mapped according to the date and time of the measurement, and also the indication's location on the structure thanks to the decision support feature, it is saved in a storage medium connected to the central processing unit. This is saved together with the current baseline of the asset for further monitoring operations. In the current application, the storage medium is a database. The signals may be read from the database and analyzed by the user in the Data Analytics platform at any point in time, accessing any of the features of visualization, processing, decision support or reporting, available for data post-processing. All data can be plotted in 2D or 3D, and statistical/signal processing tools are available to the end-user to perform the desired analysis. This analysis may include numerical models to evaluate asset's remaining life and its relation to long-term mechanical behavior properties. The final output of the Data Analytics platform can be accessed in a table, which states the name of the detected flaws and their locations regarding the global coordinate frame. By applying novelty detection, as depicted in the monitoring flowchart, during the run of the set of tests, if an uncategorized flaw is detected or if there is a significant deviation in the region of a previous indication, an alert is emitted. This is due to the baseline difference between the baseline generated during the inspection process and the one during the monitoring process.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their fall scope of equivalents.

The invention claimed is:

1. Magneto-optical system for guided wave inspection and monitoring comprising:
    wave emitter based on magnetostrictive transducer technology;
    a network of optical fiber sensors, comprising at least one optical node formed by an array of at least three optical fiber sensors with the same angular orientation;
    a central processing unit;
    wherein the wave emitter and one optical node are packaged together in a protective shell, forming a magneto-optical transducer which is mechanically coupled to the asset to be monitored, and wherein the optical node has a specific axial position relative to the wave emitter, and
    wherein the magneto-optical system is configured to obtain indications angle classification using supervised machine learning algorithm, running in the central processing unit, in order to distinguish if the indication represents either a characteristic of the asset or a defect, and obtain an inspection baseline of the actual condition of the asset.

2. System according to claim 1, wherein the angular orientation of the fiber sensors in the optical node is perpendicular relative to the direction of the propagating wave to detect longitudinal waves in the structure.

3. System according to claim 1, wherein the angular orientation of the fiber sensors in the optical node is adjusted to 45°+/−5° relative to the direction of the propagating wave to detect torsional/shear horizontal waves in the structure.

4. System according to claim 1, wherein one of the at least one optical node is arranged to detect longitudinal waveguides, and one of the at least one optical node is arranged to detect torsional/shear horizontal waveguides.

5. System according to claim 1, wherein the optical node further comprises a fiber optic temperature sensor.

6. System according to claim 1, wherein the optical nodes are multiplexed in a single optical fiber.

7. System according to claim 1, wherein the mechanical coupling of the optical fiber sensors of the optical node to the structure is achieved by using an adaptive pressing device.

8. System according to claim 7, wherein a layer of newtonian or non-newtonian fluid, acting as couplant, is used between the optical fiber sensors of the optical node and the structure to be monitored.

9. System according to claim 1, wherein the magneto-optical probe is configured to operate in a pulse-echo configuration.

10. System according to claim 1, wherein at the least one optical node is encapsulated, forming at least one optical probe, being arranged to operate in cooperation with the magneto-optical probe in a pitch-n-catch configuration.

11. System according to claim 1, wherein the central processing unit comprises:
    processing means adapted to provide an user interface and configured to execute data processing algorithms; and
    a storage medium.

12. Method of operation the Magneto-optical system of claim 1, comprising the steps of:
    registering the installation position of the wave emitter in the asset coordinate frame;
    wave emitter emits a guided-wave signal to locate, with respect to the asset coordinate frame, the at least one optical node installed in the asset;
    wave emitter performs a frequency sweep of the guided-wave signal, wherein for each frequency value it is performed data fusion both at the optical node and optical sensor's level, in order to identify and locate an indications angle;
    calculation of each indication reflectivity by the central processing unit based on the data fusion;
    indications angle classification using supervised machine learning algorithm, running in the central processing unit, in order to distinguish if the indication represents either a characteristic of the asset or a defect;
    generation of an inspection baseline of the actual condition of the asset;
    storing of the results;
    starting the monitoring stage by generating a new baseline and comparing it with the inspection baseline by performing a set of validation test; and
    validation test results are sent to the user interface.

13. Method according to claim 12, wherein the guided-wave signal from the wave emitter is emitted with direction control.

14. Method according to claim 12, wherein the location of the optical nodes installed in the asset, with respect to the asset coordinate frame, is achieved by measuring the time-of-arrival of the first echo, using the same time reference to all optical node's readings.

15. Method according to claim 12, wherein the location of the optical nodes installed in the asset is determined by calculating each optical node location with respect to a known well-defined indication of the structure, whose location was previously defined.

16. Method according to claim 12, wherein the monitoring stage can be triggered periodically.

17. Method according to claim 12, wherein the monitoring stage comprises the following steps:
 wave emitter emits a guided-wave signal;
 wave emitter performs a frequency sweep of the guided-wave signal, wherein for each frequency value it is performed data fusion both at the optical node and optical sensor's level, in order to identify and locate an indication's angle;
 calculation of each indication reflectivity by the central processing unit;
 indication's angle classification using supervised machine learning algorithm, running in the central processing unit, in order to distinguish if the indication represents either a characteristic of the asset or a defect;
 generation of a monitoring baseline of the actual condition of the asset; and
 storing of the results.

18. Method according to claim 17, wherein the guided-wave signal from the wave emitter is emitted with direction control.

* * * * *